Oct. 11, 1955 W. G. WING 2,720,626
INTEGRATOR
Filed June 6, 1950
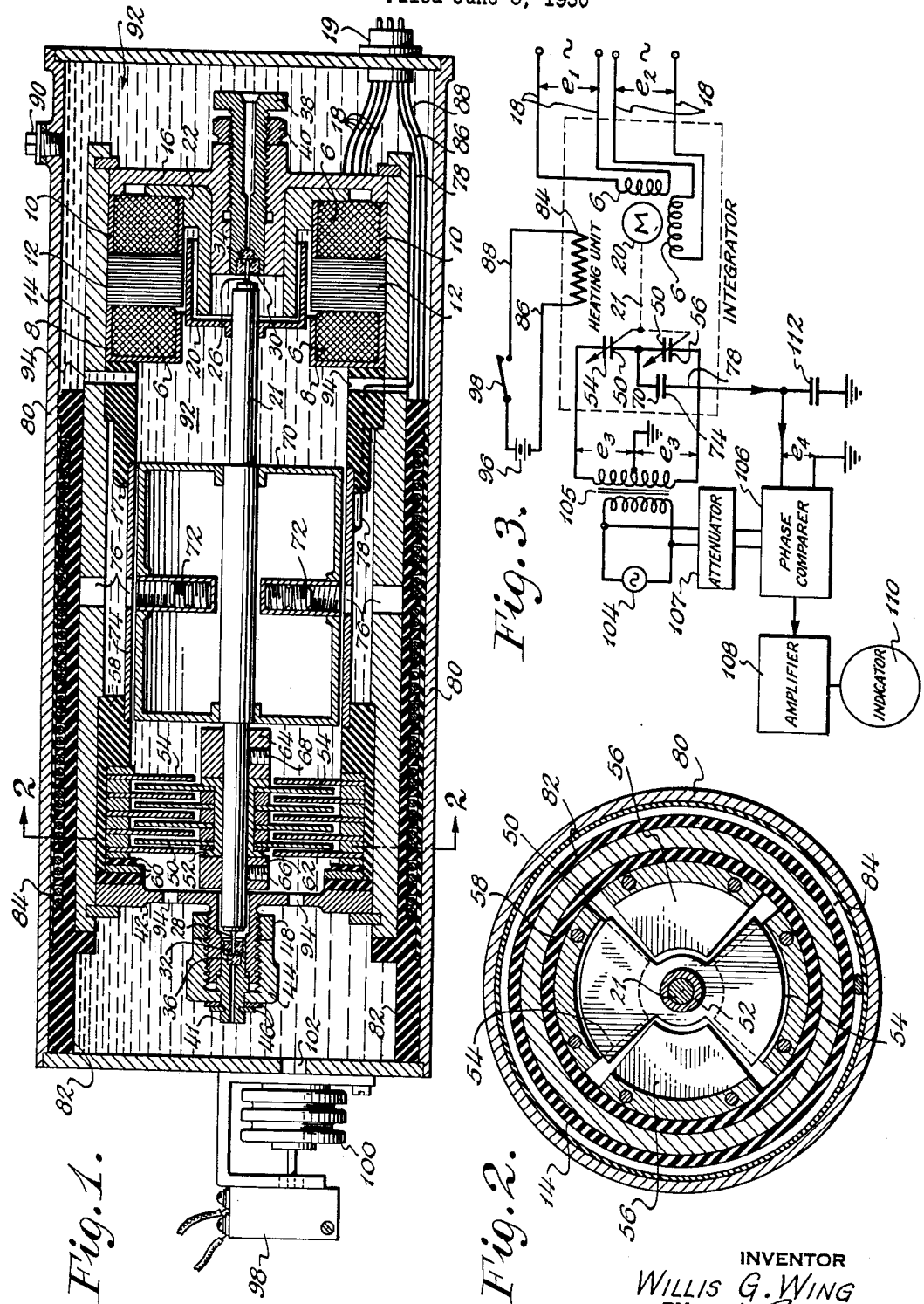
INVENTOR
WILLIS G. WING
BY
R. V. Craddock
ATTORNEY

United States Patent Office 2,720,626
Patented Oct. 11, 1955

2,720,626

INTEGRATOR

Willis G. Wing, Roslyn Heights, N. Y., assignor to Sperry Rand Corporation, a corporation of Delaware Application June 6, 1950, Serial No. 166,319

5 Claims. (Cl. 324—92)

This invention relates to electrical integrators and particularly to integrators of the electric motor type which are responsive to a wide range of input signals.

Integrators of the electric motor type are frequently employed in control systems to provide a smoothing effect, and it is often desirable that the integrators function with very small input signals.

The minimum input signal to which integrators of the electric motor type are responsive is largely limited by frictional losses, the accelerating torque required to overcome the moment of inertia of the rotatable assembly, and the torque required to actuate an indicator or a signal producing apparatus.

Conventional electric motor type integrators require rather large minimum input signals to overcome these losses and torques. Consequently, the range of input signals to which such integrators are responsive is rather limited.

These limitations are substantially overcome in the present invention by immersing the rotatable assembly in a liquid so that frictional losses are minimized by flotation and so that the accelerating torque required to overcome the moment of inertia of the rotatable assembly is greatly overshadowed by the damping effect of the liquid. The torque required to actuate the output signal producing means is minimized by providing a balanced pick-off of the condenser type and by employing low energy levels at the pick-off. Since the load on the bearings supporting the rotatable assembly is small, jewel bearings having very low frictional losses may be employed.

It is an object of this invention to provide an improved integrator which is responsive to a wide range of input signals.

A further object of the invention is to provide an integrator which may be employed with very small input signals.

These and other objects of the invention will be apparent from the following description, the appended claims, and the drawings, in which Fig. 1 is a longitudinal sectional view of the integrator;

Fig. 2 is a cross-sectional view along line 2—2 in Fig. 1; and

Fig. 3 is a schematic diagram showing how the integrator may be employed with other apparatus to produce an indication of the time integral of an input signal.

As shown in Fig. 1, the integrator is enclosed in a cylindrical container which serves to contain the viscous fluid in which the rotatable parts are immersed. The integrator comprises a two-phase induction type electric motor which is located near the right-hand end of the container, a condenser type pick-off located near the left-hand end of the container, a rotatable shaft connecting the rotor of the motor and the rotor of the condenser pick-off, and a float located along the shaft approximately midway between the motor and the pick-off.

Referring now to Fig. 1, two-phase motor windings 6 are partly enclosed by two metallic protective shields 8 and 10. The windings 6 comprise two wires interlaced around a large number of teeth (not shown) in a laminated iron stator core 12 in a conventional manner so that the stator produces a revolving magnetic field.

In the embodiment of the invention disclosed herein, the motor windings 6 are designed for use with signals having a frequency of 400 cycles per second and a maximum effective value of 30 volts. It will be apparent that windings designed for use with other frequencies and maximum voltages may be employed.

This stator assembly of the motor is secured within a cylindrical frame 14 between an end plate 16 and an annular-shaped insulating block 17 which engages a shoulder in the frame 14.

Four leads 18 are provided for connecting the two motor windings 6 to external signal sources through a plug 19. Ordinarily a fixed voltage is applied to one of the windings 6 and the voltage to be integrated is applied to the other winding. Since a motor of this type usually does not start with the fixed voltage alone, I choose to term the voltage applied to said other winding the actuating voltage.

A cylindrical copper shell 20, which is enclosed by the stator assembly, serves as an induction type rotor, and it is rigidly attached to a rotatable, conductive shaft 21.

The magnetic path of the stator is completed by a cylindrical iron core 22 which extends into the cylindrical rotor 20. The core 22 is secured between the end plate 16 and the shield 10. It is to be observed that it is not necessary that the cylindrical core 22 be connected to the laminated core 12 by a high permeability magnetic path.

The bearings 26 and 28 of the shaft 21 are supported by annular jewel bearings 30 and 32 and by end jewel bearings 34 and 36, respectively. The jewel bearings at the right-hand end are supported by a threaded member 38 which engages threads in a protrusion of the end plate 16. A locknut 40 is provided for securing the member 38 after the location of the bearings 30 and 34 has been adjusted.

The jewels at the left-hand end are supported by a cylindrical member 41 which is supported by a hole in a protrusion of the left-hand end plate 42. A threaded sleeve 44, which engages threads on the outer surface of the protrusion of the end plate 42, is secured in rotatable contact with the member 41 by means of a pair of washers 46, so that the position of the member 41 and consequently the bearings 32 and 36 may be adjusted. A locknut 48 is provided for securing the sleeve 44 after the location of the bearings 32 and 36 has been adjusted.

A condenser type pick-off is employed which comprises a set of butterfly-shaped rotor plates 50 which are supported by and electrically connected to the conductive shaft 21 by means of a conductive block 52 and the conductive spacers 53, and two sets of stator plates 54 and 56 (see Fig. 2) which are supported by an insulating member 58. The two sets of stator plates are insulated from one another, and the plates of each set are electrically connected by means of conductive spacers.

Three insulating washers 60 serve to secure the stator plates and the insulating member 58 between a shoulder in the frame 14 and the end plate 42.

A pair of blocks 62 and 64 and the set screws 66 and 68 serve to secure the rotor block 52 in the desired longitudinal position along the shaft 21.

A closed cylindrical float 70, which is made of an electrically conductive metal, is secured midway along the shaft 21 so that it is located preferably at the center of gravity of the shaft 21 and the apparatus attached thereto. Four set screw assemblies 72, which are spaced equidistant around the central portion of the float 70, are provided so that the entire rotor assembly can be balanced.

Since the weight of the entire rotatable assembly is carried by flotation in a liquid, its rotational center of gravity should preferably coincide with its center of flotation. Therefore, the balancing adjustments should be made while the rotatable assembly is immersed or floating in a liquid.

An electrically conductive, cylindrical shell 74 is secured between shoulders in insulating members 17 and 58, and the shell 74 surrounds the outer periphery of the float 70. Holes 76 are provided in the members 14 and 74 so that the set screws 72 may be adjusted while the integrator apparatus is assembled within the frame 14.

A lead 78 is connected between the shell 74 and the plug 19 so that external apparatus may be coupled to the rotor condenser plates 50 through the capacitance between the float 70 and the shell 74. Leads are also provided between the sets of stator plates 54 and 56 and the plug 19 so that each set of the stator plates may be directly connected to external apparatus. These two leads are not shown in Fig. 1 since it is obvious that they may be located in any convenient place.

The entire motor and pick-off assembly is enclosed within a closed cylindrical container or casing 80. The frame 14 is secured to the container 80 by a cylindrical insulating member 82. A heater winding 84 is located in grooves around the insulator 82, and two leads 86 and 88 serve to connect the heater winding 84 to the plug 19.

A filling plug 90 is provided in the container 80, and the container 80 is completely filled with a viscous fluid 92 which is an electrical non-conductor. Several holes 94 are provided so that the fluid has free access to all parts of the motor and pick-off assembly except the space enclosed by the float 70.

The specific gravity of the fluid 92 is selected so that the float 70 supports all or substantially all the weight of the rotatable assembly, thereby substantially eliminating friction at the bearings 30 and 32 and permitting the use of small, low friction type jewel bearings.

There is substantially no longitudinal thrust on the end bearings 34 and 36 since the rotor 19 produces very little side thrust. Thus friction at the end bearings 34 and 36 is substantially eliminated.

The viscosity of the fluid 92 and the spacing between the float 70 and the sleeve 74 are selected so that the damping coefficient is very large.

It is desirable that the time required for the rotatable assembly to attain an angular velocity proportional to the amplitude of the signals applied to the windings 6 be very small. This is achieved by making the damping effect of the liquid 92 much larger than the accelerating torque required to overcome the moment of inertia of the rotatable assembly. Since the time-delay due to the moment of inertia of the rotatable assembly equals the moment of inertia of the rotatable assembly divided by the damping coefficient, and since the damping coefficient is very large, it follows that the time-delay is very small. Time-delays as small as one millisecond may be obtained easily with the apparatus disclosed herein.

Thus, it is apparent that the accelerating torque of the rotatable assembly due to the effect of its moment of inertia is substantially eliminated.

If the fluid 92 is sufficiently viscous that no turbulence is produced due to rotation of the rotor assembly and if the motor output is a linear function of the applied voltage, the angular velocity of the shaft 21 is a linear function of the voltages applied to the windings 6.

A silicone having a viscosity of 1000 centistokes has been found satisfactory for use as the fluid 92.

In order to maintain the viscosity of the fluid 92 substantially constant, it is necessary to maintain the fluid 92 at a substantially constant temperature. Temperature control is effected by means of the heater winding 84 which is connected to a source of current 96 through a micro-switch 98 as shown in Fig. 3. The switch 98 is actuated by a shaft connected to a pressure responsive bellows 100. The switch and bellows assembly 98, 100 is attached to the container 80, and the fluid 92 within the container 80 enters the bellows 100 through a hole 102 in the container 80. The coefficient of expansion of most liquids is large enough to make the volume change which accompanies a small temperature change quite appreciable. Thus, when the fluid cools slightly, the bellows contracts and causes the switch 98 to close, thereby energizing the heater 84. When the fluid becomes slightly warmer, the bellows expands and causes the switch 98 to open, thereby de-energizing the heater 84.

Thus, the apparatus shown in Fig. 1 serves to rotate the shaft 21 an amount proportional to the time integral of the amplitude of one of the signals applied to the two-phase motor winding 6 when a signal of constant amplitude is applied to the other winding 6 of the two-phase motor, and by proper design the rotation of the shaft 21 can be made to be a linear function of the time integral of the amplitude of the signal.

Fig. 3 shows how the integrator may be employed with additional apparatus to produce an indication of the time integral of a signal.

A signal $e_1$ of fixed amplitude is applied to one of the motor windings 6, and a signal $e_2$ of variable amplitude is applied to the other winding. Thus, the rotation of the shaft 21 is linearly proportional to the time integral of the signal $e_2$.

A voltage source 104, which produces an alternating voltage of large amplitude, is connected across the primary of a step-up transformer 105. Each end of the secondary windings of the transformer 105 is connected to one of the sets of interconnected stator plates of the pick-off so that the voltage $e_3$ produced across each half of the secondary windings is effectively applied across each of the condenser sections 50, 54 and 50, 56 which comprise the pick-off. Thus, the voltage produced between the rotor plates 50 and ground varies in accordance with the position of the condenser plates. If the condenser plates are initially positioned to produce zero output, the voltage produced at the rotor 50 is proportional to the time integral of the signals $e_2$ which have been applied to the motor winding.

The voltage between the rotor plates 50 and ground is applied through the cylindrical condenser 70, 74 to a phase comparer 106, and the signal produced by the source 104 is applied to the phase comparer 106 through an attenuator 107.

The phase comparer 106 serves to produce a signal having an amplitude proportional to the signal $e_4$ and a polarity determined by the phase relation between the signal $e_4$ and the signal produced by the source 104.

The output of the phase comparer 106 is applied to an amplifier 108, and the output of the amplifier 108 is measured by an indicator 110 which may be a vacuum tube voltmeter, for example.

Preferably a loading condenser 112 is connected across the input of the phase detector 106 so as to minimize the effects of variations in the losses introduced by the lead 78 and other associated circuits.

Since the condenser pick-off arrangement is balanced and since low energy levels are employed, the pick-off has substantially no effect upon the rotation of the shaft 21.

As discussed above, the rotating assembly can be designed so that the angular velocity of the shaft 21 is substantially a linear function of the voltage applied to the windings 6. Also, it will be apparent that the pick-off condenser plates 50, 54 and 56 can be designed so that the output signal produced thereby is substantially a linear function of the angular displacement of the shaft 21. For such an arrangement the voltage applied to the input of the phase comparer 106 is determined by the following:

$$e_4 = K e_1 e_3 \int e_2 dt$$

where K is a constant which is determined experimentally.

If both $e_1$ and $e_2$ are variable, the voltage applied to the input of the phase comparer 106 is determined by the following:

$$e_4 = K e_3 \int e_1 e_2 dt$$

It will be apparent that these relations are valid only during the time intervals required for the shaft 21 to rotate one-eighth turn in either direction from the position at which $e_4$ is zero.

Ordinarily, integrators of this type are employed in servo control systems and the signals which are to be integrated are of small amplitude and of reversible polarity, so that it is not necessary that the integrator rotate more than one-eighth turn in either direction. However, it will be apparent that the integrator may be employed in systems that require that the integrator rotate more than one-eighth turn if a different type pick-off is employed.

It will also be apparent that the shaft 21 may be extended outside the container 80 by suitable means and the rotation of the shaft is then measured in order to determine the time integral of the input signals. In this case the condenser type pick-off is eliminated.

If one input signal to the windings 6 is of a constant effective value of 30 volts, accurate integration is obtained when voltages from .001 to 30 volts are applied to the other winding.

An example of the angular velocities experimentally obtained with an integrator of the type shown in Fig. 1 when one of the signals applied to the windings 6 is varied is as follows:

| Voltage applied to each of windings 6 | R. P. S. of Shaft 21 |
|---|---|
| 2 | .0066 |
| 25.1 | .085 |

It will be apparent that various modifications may be made in the apparatus disclosed herein without departing from the scope of the invention. For example, a different type of pick-off may be employed, temperature control may be effected in various ways, and the number of rotations of the shaft 21 may be counted rather than merely measuring a portion of one-quarter revolution as disclosed herein.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In an integrator, the combination comprising an electric motor whose output torque varies substantially in linear proportion to its actuating voltage, said motor having a rotor forming part of a rotatable assembly, said rotatable assembly further including a float rigid with said rotor and coaxial therewith, a sealed container, bearing means for mounting said rotatable assembly in said container for unlimited and substantially unrestricted rotation, said container including a viscous liquid in which said rotatable assembly is immersed, the viscosity of said liquid being correlated to the arrangement of the liquid-filled spaces between the rotatable assembly and the container in such a manner that the output torque expended by the motor in overcoming the inertia of the rotatable assembly is rendered negligible with respect to the motor torque expended in overcoming the viscous drag of said liquid on said rotatable assembly, and the specific gravity of said liquid being such that said float maintains the rotatable assembly in neutral equilibrium in said bearing means, whereby the speed of the motor is made to vary substantially in linear proportion to said motor actuating voltage, the angular distance through which said motor rotates in a given period of time being a measure of the integral of said actuating voltage over said period.

2. The integrator of claim 1 further including an electrical capacity-type of pick-off for providing a signal proportional to the angular distance through which the motor rotates.

3. The integrator of claim 1 wherein the motor is of the induction type and its rotor comprises a non-magnetic cylindrical shell.

4. The integrator of claim 1 further comprising electrical heating means for heating the viscous liquid, and pressure-responsive means for controlling said heating means substantially to maintain said liquid at a given viscosity.

5. In an integrator, the combination comprising an electric motor whose output torque varies substantially in linear proportion to its actuating voltage, said motor having a rotor forming part of a rotatable assembly, said rotatable assembly further including a float and a first pick-off element each rigid with said rotor and coaxial therewith, a sealed container, bearing means for mounting said rotatable assembly in said container for unlimited and substantially unrestricted rotation, said container including a viscous liquid in which said rotatable assembly is immersed, the viscosity of said liquid being correlated to the arrangement of the liquid-filled spaces between the rotatable assembly and the container in such a manner that the output torque expended by the rotor in overcoming the inertia of the rotatable assembly is rendered negligible with respect to the motor torque expended in overcoming the viscous drag of said liquid on said rotatable assembly, and the specific gravity of said liquid being such that said float maintains the rotatable assembly in neutral equilibrium in said bearing means, whereby the speed of the motor is made to vary substantially in linear proportion to said motor actuating voltage, and a second pick-off element rigid with said container and disposed for cooperation with said first pick-off element for supplying a signal in accordance with rotational displacements of said rotatable assembly, said signal being a measure of the time integral of said actuating voltage.

References Cited in the file of this patent

UNITED STATES PATENTS

| | | |
|---|---|---|
| 408,295 | Ferranti | Aug. 6, 1889 |
| 1,019,432 | Dempster | Mar. 5, 1912 |
| 1,864,586 | Ferranti | June 28, 1932 |
| 2,024,966 | Chilowsky | Dec. 17, 1935 |
| 2,057,845 | Pattee | Oct. 20, 1936 |
| 2,059,271 | Parker | Nov. 3, 1936 |
| 2,352,103 | Jones | June 20, 1944 |
| 2,417,282 | Wheeler | Mar. 11, 1947 |

FOREIGN PATENTS

| | | |
|---|---|---|
| 606,521 | Great Britain | Aug. 16, 1948 |